United States Patent [19]
Kitahata et al.

[11] Patent Number: 6,143,096
[45] Date of Patent: *Nov. 7, 2000

[54] PROCESS FOR PRODUCING ALLOY, ALLOY AND ALLOY CONTAINING SHEETS MADE THEREFROM

[75] Inventors: Shinichi Kitahata, Toride; Hisao Kanzaki, Takatsuki, both of Japan

[73] Assignee: Hitachi Maxell, Ltd., Osaka, Japan

[*] Notice: This patent is subject to a terminal disclaimer.

[21] Appl. No.: 08/812,944

[22] Filed: Mar. 4, 1997

[30] Foreign Application Priority Data

Mar. 4, 1996 [JP] Japan .................................. 8-075147

[51] Int. Cl.$^7$ .................................................. G11B 5/706
[52] U.S. Cl. ...................... 148/300; 148/314; 252/62.54; 252/62.55
[58] Field of Search .............................. 252/62.54, 62.55; 148/300, 314

[56] References Cited

U.S. PATENT DOCUMENTS 4,784,703 11/1988 Pirich et al. ............................. 148/314
5,648,160 7/1997 Kishimoto et al. ..................... 148/314

FOREIGN PATENT DOCUMENTS 61-105727 5/1986 Japan .

OTHER PUBLICATIONS

"Atomization", *Metals Handbook*, 9th Ed., vol. 7, pp. 25–39, 1984.

Primary Examiner—George Wyszomierski
Attorney, Agent, or Firm—Birch, Stewart, Kolasch & Birch, LLP

[57] ABSTRACT

A powdery alloy mainly composed of Mn—Bi having particle diameter of 5 μm or less which has a magnetic anisotropy of 6000 Oe or more in coercive force and 35 emu/g or more in saturation magnetization, wherein the size of crystallite according to Scheler's formula is 700 Å or less; and an alloy containing sheet of 0.5 to 10 μm thickness in which a powdery alloy mainly composed of Mn—Bi having particle diameter of 5 μm or less which has a magnetic anisotropy of 6000 Oe or more in coercive force and 35 emu/g or more in saturation magnetization is bound with a binder into a sheet of 0.5 to 10 μm thickness in a state magnetically oriented toward said direction of magnetic anisotropy, wherein when said sheet is measured toward said magnetic anisotropy direction at 16 kOe and 5 kOe, the ratio of residual magnetic flux density Mr16k and Mr5k (Mr5k/Mr16k) is 0.85 or more.

7 Claims, 4 Drawing Sheets

2 μm

RELATION BETWEEN HEATING TIME AT 266°C AND SATURATION MAGNETIZATION 6,143,096

PROCESS FOR PRODUCING ALLOY, ALLOY AND ALLOY CONTAINING SHEETS MADE THEREFROM

BACKGROUND OF THE INVENTION

The present invention relates to a process for producing an alloy, the alloy and alloy containing sheets to which said alloy is applied. Particularly, the present invention provides a novel means to homogeneously alloy different kinds of metallic materials which are hardly soluble in each other and have melting points and densities widely different from each other, and relates to a useful means in particular when the alloy thus obtained is used in a powdery form. In addition, this means contributes to improve the recording property in the field of magnetically recording media.

In recent years, various alloys have been tried to be produced, but it have been difficult to obtain an purposed alloy when the metallic materials are hardly soluble in each other or have melting points and densities widely different from each other, due to occurrence of phase separation or segregation if the materials are simply melted together in a furnace.

Thus, first, a method to remove the influence of gravity at the time of solidification is considered, but it is too intricate on the process to realize a state of nongravitation, so that this process is unpractical.

Secondly, for a practical method, a powder metallurgical process has been proposed in which the powder of metallic material itself is tamped so as to utilize a solid phase reaction, but this yet have not been attained to the extent so as to be able to control in a homogeneous composition up to the finest area.

As other methods than these, means such as MA (mechanical alloying) have been known, but any product having higher properties has not been obtained for the long time required for alloying.

For example, a powder metallurgical process of prior art includes a step to preliminarily crush a metallic material into powder, a step to mix the obtained powder and then form molded pieces under pressure by a press, a step to make an alloy ingot by heating, and a step to crush this into fine powder. These steps hereinafter are described in the order.

(1) Crushing step of metallic material

Plural kinds of metallic materials are crushed under a non-oxidizing atmosphere into fine powder in order of 100 microns or less respectively. Materials apt to be oxidized or produce noxious powdery dust are hard to be handled. Besides, in the case of a metal which is soft and stretchable it is not easy to crush this material into powder.

(2) Molding step of the powder obtained above after mixing by press under pressure Under a non-oxidizing atmosphere the powder of each metallic material is weighed in a prescribed quantity respectively. They are mixed and then formed into a molded product by means of a press. Metals which are easily oxidized must be formulated in excessive mole ratio. Therefore, some amount of unreacted materials are left in the final product, which often result in deterioration of properties.

(3) Alloy ingot making step by heating

The molded product is heated under a closely controlled atmosphere for long period to be alloyed.

(4) Crushing step of alloy ingot

The alloy ingot is taken out and in advance roughly crushed into powder of particle size between 100 and 500 microns. Then, the powder is finely ground into a powder of particle size about from 1 to 5 microns by wet milling using a ball mill, a planetary ball mill or the like, or by dry milling using a jet mill or the like to obtain an alloy powder.

In the above the process of prior art is outlined, which requires a very close control of atmosphere and very long time. Besides, when an alloy ingot is strongly crushed and milled into a fine powder of micron size, a broad distribution in the particle size of powder is brought.

For example, when the process is applied to the synthesis of magnetic recording element comprising an alloy powder mainly composed of Mn—Bi, the materials of Mn and Bi respectively are preliminarily crushed under a non-oxidizing atmosphere into fine powder in order of 100 microns or less, these are weighed in a prescribed quantity respectively, then are mixed and molded. The molded product further is heated under a non-oxidizing atmosphere for 10 to 20 days to form a MnBi ingot. Then, the ingot is submitted to wet milling to give an MnBi alloy powder. Such steps as mentioned above are employed. Accordingly, the process includes such drawbacks that it requires a long time for producing alloy powder and is inferior in productivity. Besides, due to the powerful crushing of ingot into fine powder in order of micron, deterioration of form distribution and change in quality of crystals often are brought. This causes the deterioration of magnetic property distribution of MnBi alloy powder as magnetic recording element and the variability of magnetic property of the final product originated from the nonuniform oxidation of material.

After all, by the powder metallurgical process, until now no means for producing alloy which can be controlled in a homogeneous composition up to the finest area could have been found, because there is a limit in providing material powder with smaller particle size, or it is impossible to employ the process when a metallic material is unstable.

Besides, when it was tried to obtain an alloy of fine particle by this powder metallurgical process, even if a powder of fine particle diameter was employed for alloying, it was impossible to control in a homogeneous composition up to the finest area, so that when the obtained alloy product was further crushed into powder, it could not be uniformly divided and no product having uniform particle size was obtained. This also brought a shortcoming to the process.

SUMMARY OF THE INVENTION

The object of the present invention is to solve a problem how to homogeneously alloy different kinds of metallic materials which are hardly soluble in each other and have melting points and densities widely different from each other.

In order to attain this object the present invention provides a process in which different kinds of metallic materials are mixed, the mixture is heated to be melted at a temperature higher than the melting point of a metal having the highest melting point, and submitted to a treatment comprising release into free space and rapid cooling to obtain a fine powder intermediate, which fine powder intermediate is submitted to a heat treatment at a temperature below the decomposition temperature of objective alloy.

DETAILED DESCRIPTION OF THE INVENTION

Figure 1:
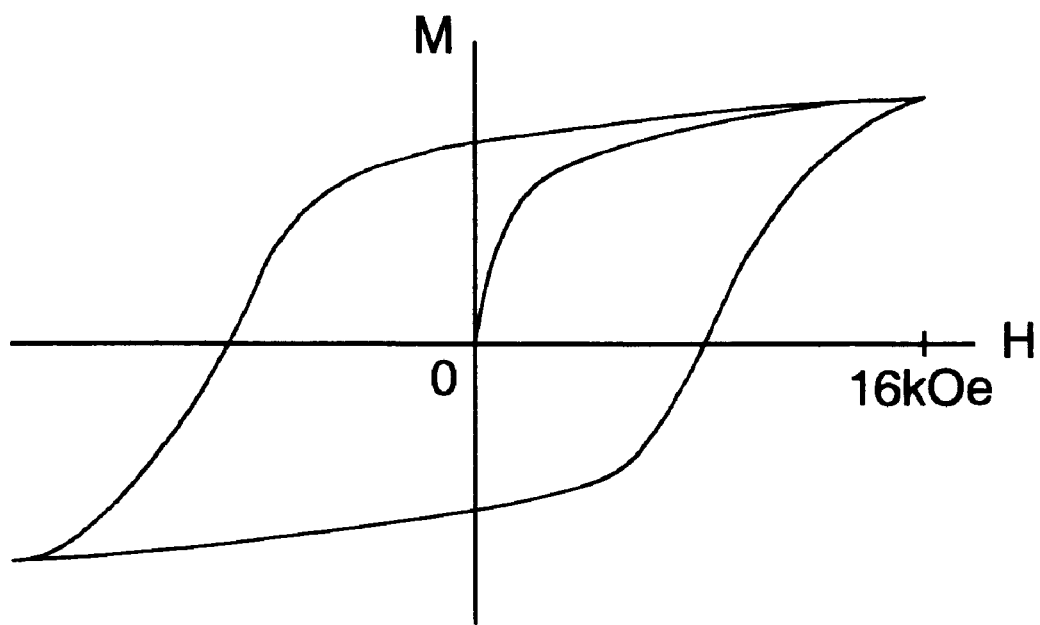
FIG. 1 is a graph which shows an example of initial magnetization curve of a longitudinally arranged MnBi coating film.

Hereinafter the present invention is explained in detail.

According to the present invention, even different kinds of metals which are hardly soluble in each other and have melting points and densities widely different from each other, can be homogeneously alloyed. Particularly, by this process metallic materials can be mixed and melted in bulk states, and therefore even if any metallic material which is chemically unstable is included, this process has an advantage that the material need not be subjected to any danger caused by powdering. Besides, owing to carrying out both heating and melting under stirring, even if the materials are of low compatibility and widely different in their densities, no phase separation can occur. In regard to this point, it is desirable to use a high frequency induction furnace. In order to obtain a fine intermediate powder, a treatment of releasing into free space and rapid cooling is suitable. Particularly, among the atomization treatments it is desirable to conduct the treatment by means of gas atomization process which uses an inert gas. It also is possible to control the crystalline state by controlling the temperature of injected gas.

The intermediate powder obtained by the atomization treatment or the like is so fine that each metal component is dispersed in minimal areas. This can minimize the applied energy in the following thermal treatment, and make the process economical. In addition, this intermediate powder, though it varies according to the combination of metals, generally is metallographically stable, so that often any close control of thermal treatment condition may not be required. Thus the applicable combination of metal components for alloy can be selected from a broad area. Before or after the thermal treatment the alloy is in a state of rough powder, which can be pressed in a mold to obtain a molded product, or the other way after the thermal treatment it can be subjected further to a grinding treatment. The alloy after the thermal treatment is controlled in a uniform composition up to very fine area, so that when it is subjected to further grinding treatment, particles are uniformly divided and a fine powder of uniform particle size can be obtained without any trouble.

The atomization process mentioned here is a method which is generally employed as a means to produce a powder of metal composed of a single element or an alloy composed of plural elements which has a particle size of several tens microns. The main uses of this process are production of alloy powder for solder material of low melting point, production of alloy powder material used for producing tool steel by a powder metallurgical process, production of alloy powder material used for producing a magnet of intermetallic compound by a powder metallurgical process and the like. Thus the process is used as means for producing powder of a system which forms a solid solution or a system which forms a intermetallic compound.

However, no example has known yet in which the process is used as a means for homogeneously alloying different kinds of metallic materials which are hardly soluble in each other and have melting points and densities widely different from each other.

On the other hand, portable cards for information recording represented by credit card or prepaid card are a kind of magnetic recording medium. However, since portable cards such as credit card are easily recorded and rewritten magnetically, accidents and crimes such that the recorded information is accidentally erased or intentionally rewritten, are of frequent occurrence. For preventing these the portable cards to which a magnetic alloy powder principally composed of MnBi is applied for the recording element, have been developed. Such a card is characterized in that a once recorded information cannot be easily erased. This is described, for example, in Japanese Patent Application Kokoku (Post-Exam Publication) No.57-38962/82, No.54-33725/79, No.52-46801/77, No.59-31764/84, No.54-19244/79, and No.57-38963/82.

In FIG. 1 an initial magnetization curve of a medium is shown to which a MnBi alloy powder is applied. As apparent from this, in spite of its high coercive force after magnetization, the medium can be magnetized by a magnetic field of about 4000 oersteds. Therefore, it is proposed in the above-mentioned literatures to utilize a magnetic alloy powder principally composed of MnBi for the recording element. So far, however, the electric current value necessary for recording is too high to cover broad application field, so that it has been necessary to further improve the recording property. Thus, the favorable magnetization property of magnetic powder which is used, that is, the ability to be magnetized in a low magnetic field is wanted, but yet it has not been attained. Further, in regard to the synthesizing process of MnBi alloy magnetic powder, Mn and Bi are far apart from each other in their melting point and specific gravity such as to be respectively 1244° C. and 271° C., 7.43 and 9.8. Thus it is a system in which an intermetallic compound of MnBi is produced by a peritectic reaction, so that a uniform alloy cannot be produced from the mixture by a process in which the material is melted and then slowly cooled. Therefore, under the present conditions, it is synthesized by the powder metallurgical process. The reason why the magnetization property is not satisfactory, is considered so as to be due to the shortcoming of the above-mentioned powder metallurgical process.

Now an example in which the present invention is applied to the synthesis of MnBi magnetic powder will be described hereinafter in order to plainly show the advantage of the present invention. The process for synthesizing MnBi magnetic powder taken up as application example is roughly divided into ① a step in which the materials of Mn and Bi are mixed, heated to the temperature higher than the melting point of every material to be melted, and then rapidly cooled to give a fine powder intermediate, ② a step in which the fine powder intermediate is subjected to thermal treatment to be crystallized, and ③ a step in which thereafter the intermediate is further ground into fine powder. Hereinafter the process is described in detail in the above-mentioned order.

(1) Step to obtain a fine powder intermediate

Figure 2A:
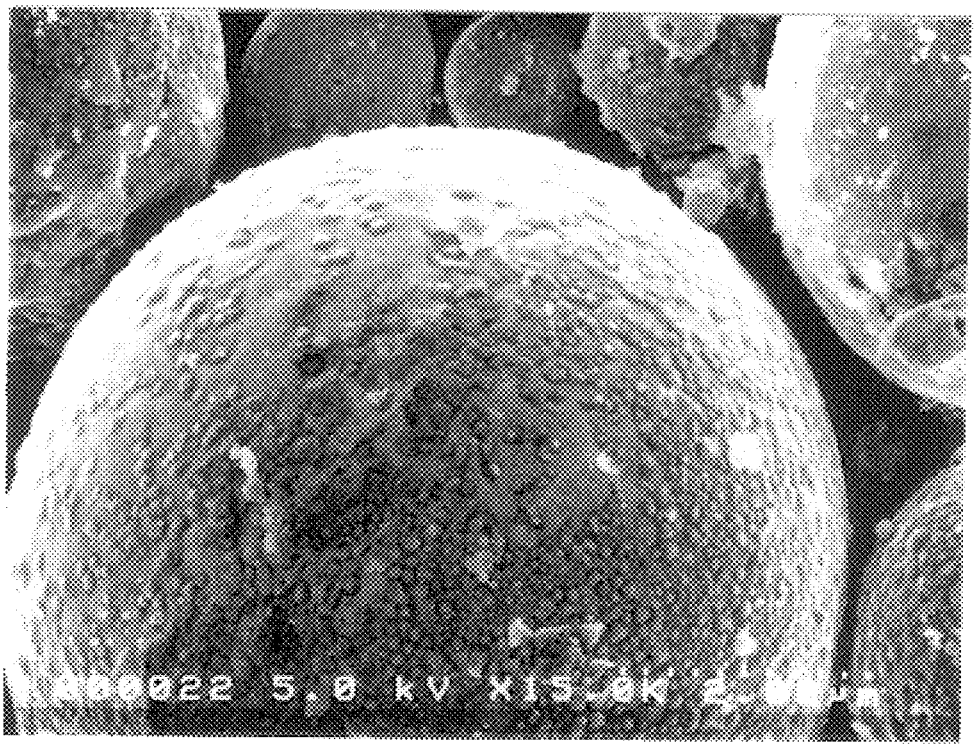
FIGS. 2a and 2b show scanning electron microscopic photographs of an example of particulate intermediate.
Figure 2B:
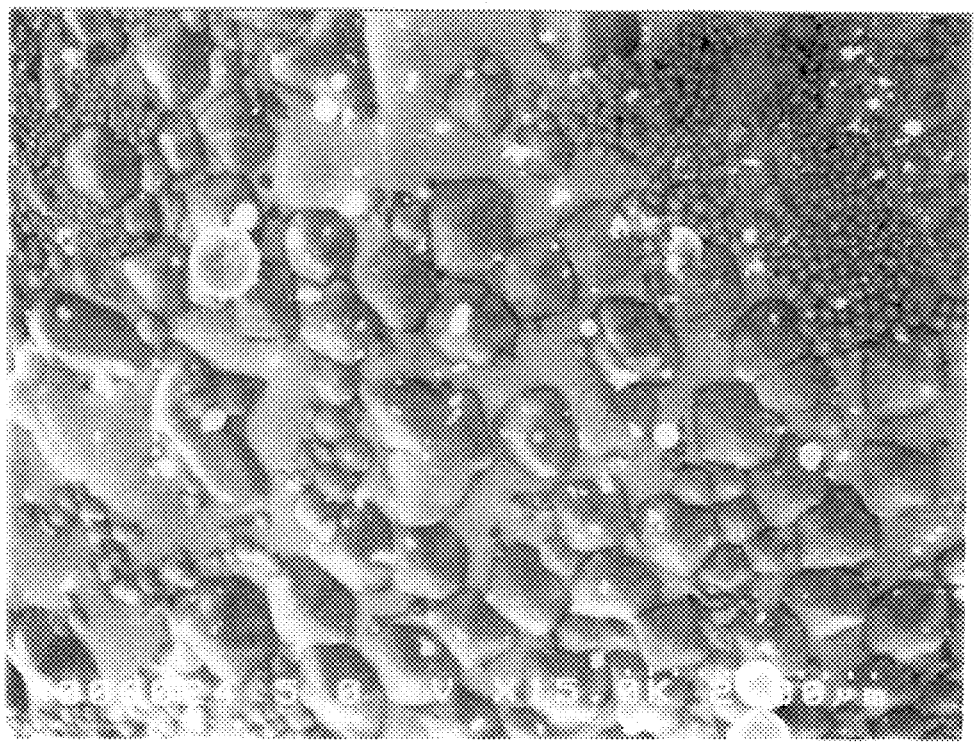

Mn and Bi are respectively prepared as materials of bulk state, which are weighed and then subjected to high frequency melting or resistance heating to give a uniform melted state. High frequency melting is preferable because it has a stirring effect to the melted liquid. The possibility of oxidation at the time of melting is small, but when the vapor pressure characteristic of the element is high, it is desirable to adjust the composition of charge in order to provide this with correction. In the case of Mn and Bi, the vapor pressure of Bi is 200 mmHg at 1319° C. and is far apart from that of Mn, i.e. 10 mmHg at 1505° C. Therefore it is desirable to adjust the composition of charge in order to compensate for vaporization of the element at the time of melting. Then this is rapidly cooled by gas atomization process. For a modification of gas atomization process, disk atomization process can be employed to conduct the similar rapid cooling. This is a process in which a solution sprayed from a nozzle is brought in contact with a rotating disk to be rapidly cooled, and characterized in that the size of rapidly cooled particles can be easily controlled so as to be suitable for producing an alloy having particle diameters of millimeter order. The size of nozzle and the pressure of sprayed gas are controlled so as to be able to conduct rapid cooling. Although the condition of rapid cooling may be optional, it is desirable that the segregation scale of Mn and Bi in a sample particle of the fine powder intermediate is less than 5 microns after the rapid cooling. If the scale is more than 5 microns, it is undesirable because a longer successive heating period may be requested. An example of SEM photographs of a fine powder intermediate thus obtained is shown in FIGS. 2a and 2b (magnification=15,000×) and FIG. 2B (magnification=15,000×). According to XMA analysis the particles which seem like rocks are the Mn components, while the part of ground is the Bi component. In this example it is realized that Mn and Bi are present in a mixture.

If it is considered in the case of powder metallurgical process that the particle size of material powder is about 100 microns at the most, it is realized that the process of the present invention is better than the former and the alloying easily proceeds by the successive heating.

When the degree of rapid cooling is lower, the Mn phase and the Bn phase are apparently separated, and the objective alloy powder is hardly obtained by the successive thermal treatment. On the contrary, it need not to rapidly cool under a condition in which Mn and Bi become amorphous. According to the condition of rapid cooling the shape of sample thus obtained may be of sphere or of scale, but the shape may be optional.

By the process mentioned above a fine powder intermediate in which Mn and Bi are almost homogeneously mixed, can be obtained. Although the intermediate is to be alloyed by the successive heating, it also is possible to simplify or omit the successive heating by means of that in the step of gas atomization the spraying gas or the spraying vessel preliminarily is heated up to the temperature necessary for alloying.

(2) Step of thermal treatment and crystallization

It was found from the X-ray diffraction of fine powder intermediate that the intermediate was composed of metallic Mn, metallic Bi and alloyed MnBi. On the step where the fine powder intermediate has been obtained, some degree of magnetization has already occurred. Therefore the intermediate may be left intact, but in order to further completely crystallize it is preferable to heat at a temperature from 260° C. to 445° C. which is a temperature below the decomposition temperature of MnBi, for from 5 minutes to 24 hours.

When the alloying was conducted by the powder metallurgical process, it was necessary to closely control the heating temperature between 265° C. and 270° C. just under the melting point of Bi so as not to heat over the melting point of Bi. This is due to that if Bi melts, the reaction does not proceed after that.

Figure 3:
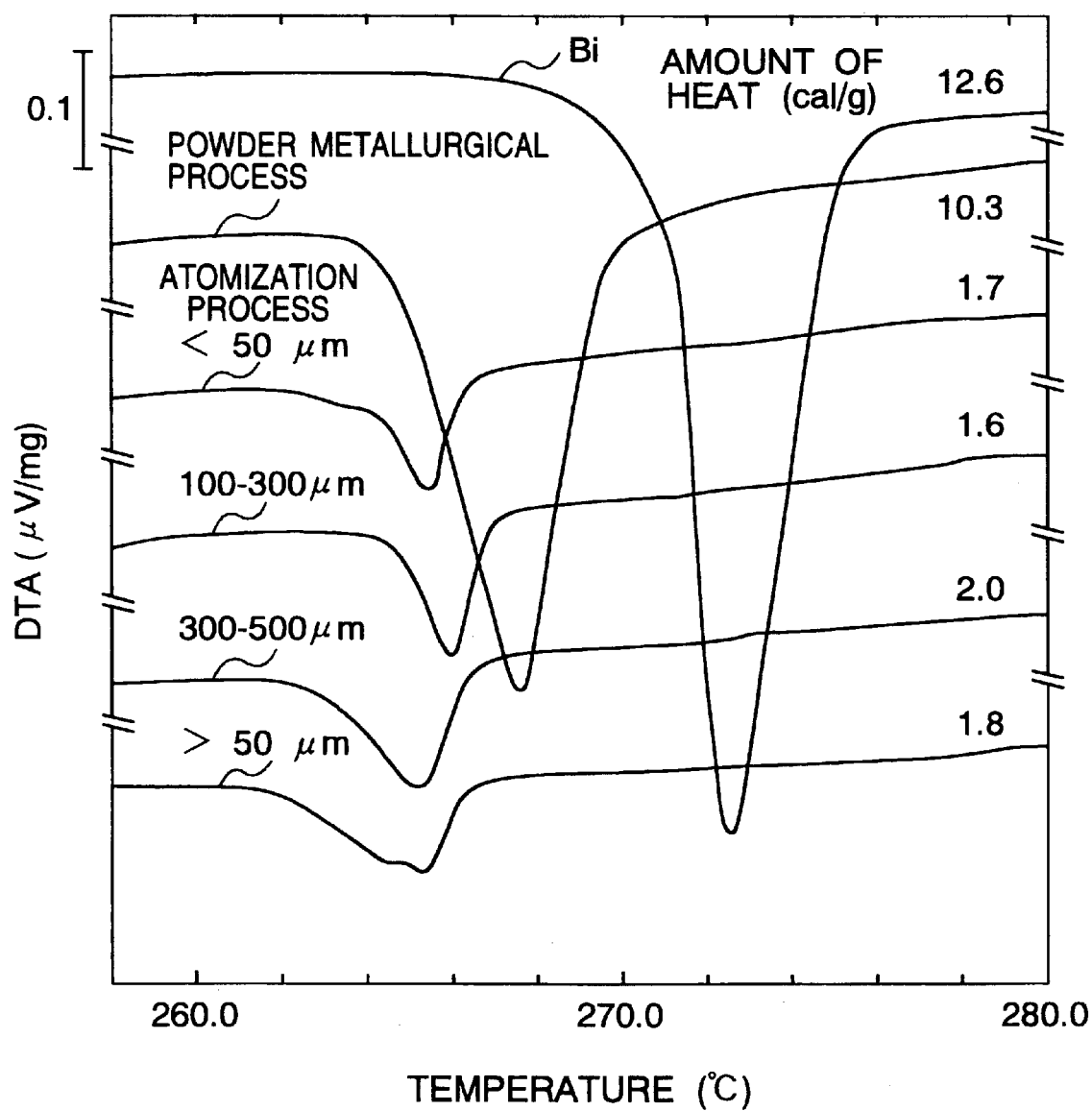
FIG. 3 is an example of thermal analysis (differential thermal analysis) result of a particulate intermediate.

On the other hand, when the process of the present invention is applied to the case, since Mn and Bi already have been homogeneously mixed, the reaction finishes at once, and even if the mixture is heated over the melting point of Bi, no bad influence is provided. The thermal energy necessary for the alloying satisfactorily is less than 5 cal/g. Heating more than this is not necessary. In FIG. 3 there are shown some measurement results of thermal analysis (DTA) of the fine powder intermediates. While the mother material which is obtained by pressing the powder (powder metallurgical process) needs a thermal energy of 10.3 cal/g for alloying, in the case of the intermediate according to the present invention, the alloying can be completed with a thermal energy less than 2 cal/g.

Figure 4:
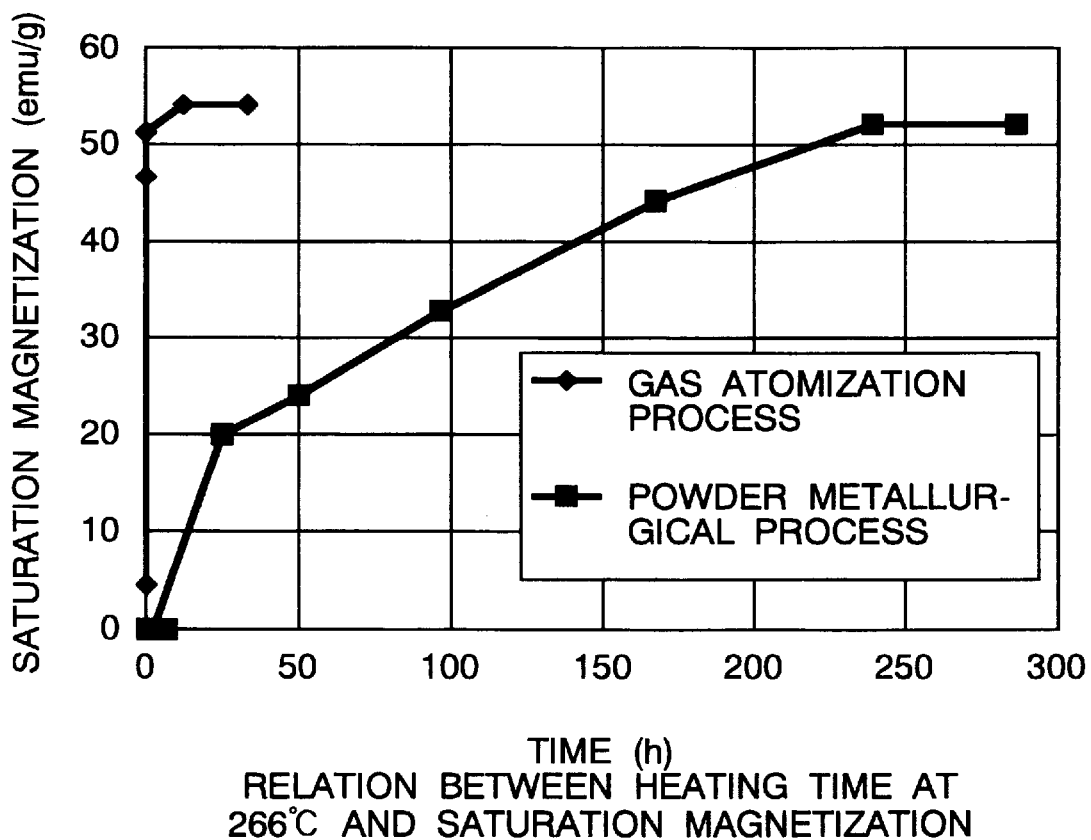
FIG. 4 is a graph which shows the relation between heating time and saturation magnetization in gas atomization process and powder metallurgical process.

FIG. 4 shows the relation between heating time and saturation magnetization of the intermediate. In the case of the intermediate according to the present invention (gas atomization process) the alloying is completed in 10 hours, and the value of magnetization is as high as 55 emu/g. On the other hand, in the case of the mother material which is obtained by pressing the powder (powder metallurgical process) needs more than 10 days for alloying and the obtained value of magnetization is as low as 52 emu/g.

(3) Step of grinding into fine powder

After crystallization the alloy powder is ground into fine particles of micron order by wet milling using a ball mill, a planetary ball mill or the like, or by dry milling using a jet mill or the like. When the MnBi ingots obtained by powder metallurgical process are crushed into powder, since the size of ingot is large and the crystallinity is not high, it is necessary to crush with very high energy. When the present invention is applied to this, since at this step already the particle size is as small as from several microns to 100 microns, the degree of crushing is lower enough than that of the case of powder metallurgical process. Therefore, a uniform alloy powder which has few defects can be obtained. Thus, when this is utilized for the recording element of magnetic recording medium, it can be magnetized under a lower magnetic field, and since it has more uniform composition than that of prior art, the corrosion resistance also is improved.

For the grinding means, those conventionally used means such as wet milling using a ball mill, a planetary ball mill and the like, or dry milling using a jet mill or the like can be used. For the liquid in wet milling a solvent containing no water such as toluene is used. The dry milling is conducted under an inert gas atmosphere. After the milling the mean particle size is about from 0.05 to 3 microns and can be controlled by the milling condition.

In order to provide the finally obtained alloy powder with a sufficient magnetic property, it is preferable to make the particle size at least 0.05 micron. On the other hand, in order to maintain the surface smoothness of finally obtained magnetic recording medium and insure satisfactory recording property it is preferable to make the particle size less than 3 microns. Thus through the above-mentioned steps a fine powder of MnBi alloy which is 40 emu/g or more in saturation magnetization and from 3000 to 14000 oersteds in coercive force can be obtained.

Additionally, a powdery alloy can be obtained mainly composed of Mn—Bi having a particle diameter of 5 μm or less, a coercive force of 6000 Oe or more and a saturation magnetization of 35 emu/g or more.

The order of the crystallizing step and the milling step may be reversed. That is to say, first a mother material in which Mn and Bi are almost uniformly mixed is finely milled, and then this may be crystallized by heating. When the product is manufactured according to this order, since distorted forms and strains in the crystal which are resulted from milling are removed in some extent by heating, in certain cases mechanical properties, chemical properties and magnetic properties of the particle may more favorably are improved. In order to produce these effects, it is necessary to provide the mother material with a constitution in which Mn and Bi are more uniformly mixed.

After milling, it is preferable to form a stable oxidated film on the surface by heating in an inert gas atmosphere containing a small quantity of oxygen or by other means.

Ordinarily, various ingredients are added to MnBi alloy powder for improvement of properties. In the case of conventional powder metallurgical process, since the heating temperature is limited, it is intrinsically difficult to introduce many ingredients. Even when it is possible, there have been some troubles such as to preliminarily make a solid solution in Mn and then bring into reaction. On the other hand, in the process according to the present invention, since it is possible to melt at a high temperature, variousing redients can be optionally added and the range of free choice is broaden in improvement of properties and control of magnetic property, so that it also is apparent in this point that the process is excellent.

In the fundamental composition of MnBi the mole ratio of Mn and Bi is 1:1. In the conventional powder metallurgical process, since it is impossible to perfectly prevent the oxidation in the crushing and other steps of metallic material, usually the quantity of Mn is increased. Therefore, the amount of saturation magnetization of the obtained MnBi does not attain to the theoretical value. On the other hand, when the process of the present invention is applied, the material can be used in a bulk state and as it is, so that there is little possibility of oxidation. Therefore it becomes possible to charge the material in the value close upon the theoretical mole ratio, so that a MnBi alloy of higher saturation magnetization degree can be obtained.

Further, it is effective for MnBi alloy powder to add aluminium from the viewpoint of controlling the lowering of signal intensity by keeping the powder under an extremely low temperature and to add nickel from the view-point of preventing the reduction of saturation magnetization under a corrosive environment of acidic atmosphere. Preferably, the amount of added aluminium is from 2 to 25 atm % based on the total of manganese and aluminium, and the amount of added nickel is from 2 to 10 atm % based on the total of manganese and nickel.

For manufacturing a magnetic recording card using the obtained powder of MnBi alloy, any usually used means can be utilized. In the point of view aimed at the magnetic property, when a magnetic recording card is made, the alloy powder according to the present invention, similarly to the case where it is utilized for magnetic recording medium, is bound with a binder into a sheet of 0.5 to 10 $\mu$m thickness in a state magnetically oriented to the direction of magnetic anisotropy. When the residual magnetic flux density under a maximum applied magnetic field toward the magnetic anisotropy direction of 16 kOe to 5 kOe was measured, the ratio of residual magnetic flux density Mr16k and Mr5k (Mr5k/Mr16k) in the result indicated 0.85 or more, and also the distribution of coercive force showed a high uniformity. Further, when X-ray diffraction was applied to the magnetic film to obtain the crystallite size of alloy powder according to the Scheler's formula, it was found that when the size of crystallite is 700 Å or less, the magnetization property is excellent. This is estimated so that when a mother material according to the present invention is used, microscopically more uniform crystals are produced and divided more uniformly during the milling step. As mentioned above, the present inventor applied the fundamental constitution of the present invention to this problem and confirmed that an alloy powder which is excellent in the magnetization property can be synthesized with good productivity by a simpler and more convenient process.

DESCRIPTION OF PREFERRED EMBODIMENT

In the following, the present invention is concretely explained by some examples in which the present invention is applied to the production of MnBi alloy powder.

EXAMPLE 1

(1) Step to obtain fine powder intermediate

Mn Flake (made by Furuuchi Kagaku K.K., purity: 99.9%) and Bi Shot (made by Furuuchi Kagaku K.K., purity: 99.9%) were employed and weighed in part by weight as follows:

| | |
|---|---|
| Mn | 1.04 part by weight |
| Bi | 3.96 part by weight |

By Gasatomizer (made by Nisshin Giken K.K.) these were subjected to high frequency melting and then sprayed into a tank to obtain a MnBi atomized powder. The product was taken into an inert tank and classified to obtain a mother material of size less than 50 microns.

(2) Step of thermal treatment for crystallization

The mother material thus obtained was heated by means of an atmosphere electric furnace under nitrogen gas atmosphere at 300° C. for 10 hours and was taken out after cooling to the room temperature.

(3) Step of grinding into fine powder

The sample after the heating was subjected to wet milling by a planetary ball mill in toluene for 2 hours at 200 rpm. After the milling, toluene was removed. Then the product was heated in a nitrogen gas flow which contained 1000 ppm of oxygen, at 80° C. for 2 hours and further kept at the room temperature for 12 hours to form an oxidized film on the surface to be stabilized. The MnBi alloy powder thus obtained had a mean particle diameter of about 2 microns. The magnetic properties measured by VSM (Vibrating Sample Magnetometer) were 8300 Oe of coercive force, and 42.0 emu/g of saturation magnetization. The maximum applied magnetic field was 16 kOe.

EXAMPLE 2

An MnBi alloy powder was obtained in the same manner as Example 1, except that after the classification of atomized MnBi powder the powder of particle size from 50 microns to 100 microns was employed for the mother material.

EXAMPLE 3

An MnBi alloy powder was obtained in the same manner as Example 1, except that after the classification of atomized MnBi powder the powder of particle size from 100 microns to 300 microns was employed for the mother material.

EXAMPLE 4

An MnBi alloy powder was obtained in the same manner as Example 1, except that after the classification of atomized MnBi powder the powder of particle size from 300 microns to 500 microns was employed for the mother material.

EXAMPLE 5

An MnBi alloy powder was obtained in the same manner as Example 1, except that after the classification of atomized MnBi powder the powder of particle size from 3 mm to 5 mm was employed for the mother material.

COMPARATIVE EXAMPLE

An MnBi alloy powder was made by means of powder metallurgical process. First, Bi Shot (made by Furuuchi Kagaku K.K., purity: 99.9%) and Mn Flake (made by Furuuchi Kagaku K.K., purity: 99.9%) were respectively ground into powder using a mortar, and then sifted through a 100 mesh sieve. Next, the powders were weighed as follows,

| | |
|---|---|
| Mn | 30.2 part by weight |
| Bi | 94.0 part by weight | and fully mixed by a mortar. Then, the mixture was molded into a column of 6 mm$\phi$×6 mm by a press under the pressure of 3 t/cm$^2$. The molded piece was vacuum-sealed into a pyrex glass tube, and subjected to thermal treatment in an electric furnace at 266° C. for 10 days to form an MnBi ingot. Then, the MnBi ingot thus obtained was granulated using a mortar under an inert atmosphere in a gloved box. Further, the product was ground using a planetary ball mill in toluene at 200 rpm for 3 hours, and then subjected to a stabilizing treatment by vapor-phase oxidation in the same manner as Example 1. The MnBi powder thus obtained had a mean particle diameter of about 2 microns. The magnetic properties measured by VSM were 8300 Oe of coercive force, and 38.0 emu/g of saturation magnetization. The maximum applied magnetic field was 16 kOe.

In regard to the alloy powders obtained in the above-mentioned examples evaluation of magnetization property was conducted. First, a composition shown below is made up into a magnetic coating material by means of a heavy duty ultrasonic disperser.

| | |
|---|---|
| MnBi alloy powder | 100 part by weight |
| polyurethane resin | 20.0 part by weight |
| (made by Dainippon Ink & Cemicals, Inc., T-5250) | |
| cyclohexanone | 115.0 part by weight |
| toluene | 115.0 part by weight |

Then, this was applied to a PET film of 75 microns thickness using an applicator so that the thickness of coating was 20 microns. During the application, a magnetic field of 10 kOe was applied to the longitudinal direction till the film has been dried up so as to provide the coating with a longitudinal orientation. The coating film was demagnetized by the following procedure. First, the film was cut into a magnetic strip of 6 mm in width and about 10 mm in length, which was fitted on a plastic columnar and dipped in liquid nitrogen to be cooled to about −180° C. Then, the bar was inserted into a magnetic field of 3 kOe, and while rotating at 1200 rpm was taken out of the magnetic field. Even at the time of taking out of the magnetic field, the operation was made so as to keep the temperature below −150° C. By this operation the sample was demagnetized. A magnetization curve of the demagnetized coating film at the room temperature was obtained. Then, the ratio of the residual magnetic flux density, Mr16k, when the maximum applied magnetic field is 16 kOe to the the residual magnetic flux density, Mr5k, when the maximum applied magnetic field is 5 kOe, was obtained. Then every time of measurement the coating film was demagnetized. The result of magnetization property is shown in Table 1.

TABLE 1

| | Example 1 | Example 2 | Example 3 | Example 4 | Example 5 | Comparative Example |
|---|---|---|---|---|---|---|
| Size of mother material | 50$\mu$ or less | 50 to 100$\mu$ | 100 to 300$\mu$ | 300 to 500$\mu$ | 3 to 5 mm | powder metallurgical process (6 mm$\phi$ × 6 mm) |
| Heating condition | 300° C. 10 hr | 300° C. 10 hr | 300° C. 10 hr | 300° C. 10 hr | 300° C. 10 hr | 266° C. 10 day |
| Saturation magnetization after heating (emu/g) | 55.5 | 55.5 | 54.5 | 54.0 | 49.0 | 52.0 |
| Saturation magnetization after milling (emu/g) | 42.0 | 41.5 | 41.5 | 41.0 | 39.5 | 38.0 |
| Coercive force after milling (Oe) | 8300 | 8200 | 8200 | 7900 | 7800 | 8300 |
| Coercive force of coating film (Oe) | 9000 | 8900 | 8900 | 8500 | 8400 | 9000 |
| Square ratio of coating | 0.80 | 0.80 | 0.79 | 0.79 | 0.75 | 0.80 |
| Magnetization property Mr5k/Mrl6k | 0.90 | 0.90 | 0.90 | 0.88 | 0.82 | 0.79 |
| Reduction rate in temperature and humidity resistant saturation magnetication (%) | 8 | 8 | 8 | 9 | 10 | 11 |

Here the reduction rate in temperature and humidity resistant saturation magnetization means the reduction rate in temperature and humidity resistant saturation magnetization of an MnBi magnetic powder which is maintained at 60° C. and 90% RH for 24 hours.

As apparent from Table 1, although in Examples 1 to 4 the heating period was so short as 10 hours, the values of saturation magnetization thereof are higher than that of Comparative Example 2 in which the heating period was 10 days. The reason why the heating period is short enough, is due to that Mn and Bi are more uniformly mixed. The high value of saturation magnetization is due to that the material hardly is apt to be oxidized and an MnBi of nearly stoichiometric composition is formed. For the coercive force after milling both the examples and the comparative examples showed high values, but in Examples 1 to 4 the values of magnetization property Mr5k/Mr16k are so high as 0.85 or more, so that the products can be magnetized under lower magnetic field. On the other hand, the comparative examples showed lower values such as less than 0.85, so that the products are inferior in the magnetic property. The reason why the value of Example 5 according to the gas atomizing process is low, is due to that the mother material of low rapid cooling rate and of large size was used, so that phase separation between Mn and Bi occurred in a scale of 5 microns or more.

Besides, in Examples 1 to 4 the products are excellent in temperature and humidity resistance. This is owing to that a magnetic powder which has a narrow particle size distribution and is more uniform than that of comparative example, is obtained. From the viewpoint of productivity, while in Comparative Example according to the metallurgical process the heating period required for alloying was so long as 10 days, in Examples 1 to 4 according to the present invention the period was very short enough as much as 10 hours. Thus, it is apparent that the latter is excellent in the point of productivity.

EXAMPLE 6

An MnBi alloy powder was obtained in the same manner as Example 2 except that in the preparation of atomized powder aluminium was added in a quantity of 2 atm. % by the expression of Al/(Mn+Al) for the raw material, and after the classification of obtained atomized powder the fraction having the size from 50 to 100μ was used for the mother material.

EXAMPLE 7

An MnBi alloy powder was obtained in the same manner as Example 2 except that in the preparation of atomized powder aluminium was added in a quantity of 5 atm. % by the expression of Al/(Mn+Al) for the raw material, and after the classification of obtained atomized powder the fraction having the size from 50 to 100μ was used for the mother material.

EXAMPLE 8

An MnBi alloy powder was obtained in the same manner as Example 2 except that in the preparation of atomized powder aluminium was added in a quantity of 10 atm. % by the expression of Al/(Mn+Al) for the raw material, and after the classification of obtained atomized powder the fraction having the size from 50 to 100μ was used for the mother material.

EXAMPLE 9

An MnBi alloy powder was obtained in the same manner as Example 2 except that in the preparation of atomized powder aluminium was added in a quantity of 20 atm. % by the expression of Al/(Mn+Al) for the raw material, and after the classification of obtained atomized powder the fraction having the size from 50 to 100μ was used for the mother material.

TABLE 2

Evaluation results of Example 2, and Examples 6 to 9

| | Example 2 | Example 6 | Example 7 | Example 8 | Example 9 |
|---|---|---|---|---|---|
| Saturation magnetization after milling (emu/g) | 41.5 | 47.0 | 45.0 | 43.0 | 41.0 |
| Coercive force after milling (Oe) | 8200 | 11000 | 12200 | 12500 | 13000 |
| 80 k coercive force (Oe) | 500 | 1500 | 2000 | 2500 | 3000 |
| Reduction rate of residul magnetization after keeping at 80 K (%) | 70 | 35 | 30 | 28 | 25 |

As apparent from Table 2, it can be seen that Examples 6 to 9 in which aluminium was contained showed higher coercive force at 80 k, and reduction rates of residual magnetization after keeping at 80 k and then returning to room temperature were less than 40% holding more than half magnetization, in comparison with Example 2 in which no aluminium was contained.

EXAMPLE 10

An MnBi alloy powder was obtained in the same manner as Example 2 except that in the preparation of atomized powder nickel was added in a quantity of 2 atm. % by the expression of Ni/(Mn+Ni) for the raw material, and after the classification of obtained atomized powder the fraction having the size from 50 to 100μ was used for the mother material.

EXAMPLE 11

An MnBi alloy powder was obtained in the same manner as Example 2 except that in the preparation of atomized powder nickel was added in a quantity of 5 atm. % by the expression of Ni/(Mn+Ni) for the raw material, and after the classification of obtained atomized powder the fraction having the size from 50 to 100μ was used for the mother material.

EXAMPLE 12

An MnBi alloy powder was obtained in the same manner as Example 2 except that in the preparation of atomized powder nickel was added in a quantity of 10 atm. % by the expression of Ni/(Mn+Ni) for the raw material, and after the classification of obtained atomized powder the fraction having the size from 50 to 100μ was used for the mother material.

As apparent from Table 3, it can be seen that Examples 10 to 12 to which Ni was added, hold about equivalent values to Example 2 in regard to saturation magnetization and coercive force, while resistance to acetic acid is greatly improved in comparison with the latter.

TABLE 3

Evaluation results of Examples 2, 10 to 12

| | Example 2 | Example 10 | Example 11 | Example 12 |
|---|---|---|---|---|
| Saturation magnetization after milling (emu/g) | 41.5 | 43.0 | 41.8 | 40.2 |
| Coercive force | 8200 | 8800 | 8400 | 7000 |

TABLE 3-continued

Evaluation results of Examples 2, 10 to 12

|  | Example 2 | Example 10 | Example 11 | Example 12 |
|---|---|---|---|---|
| after milling (Oe) |  |  |  |  |
| Reduction rate of magnetization after holding in 5 wt % aqueous acetic acid for 24 hrs (%) | 99.5 | 89.0 | 86.6 | 74.4 |

As mentioned above, in the present invention, different kinds of metals which are hardly soluble in each other and have melting point densities widely different from each other, can be homogeneously alloyed. In addition, it is effective when the obtained alloy is used in a powdery state. Particularly, since the heating time is short enough, in the production of MnBi alloy, Mn and Bi are homogeneously mixed so that the materials are scarcely oxidized and produce an MnBi alloy which has a composition more akin to the stoichiometric composition. In the result the product shows a high value of saturation magnetization. Owing to its narrow distribution of coercive force, it makes recording possible even in a lower magnetic field. Moreover the product is excellent in resistance to temperature and humidity, and provides a homogeneous powder of narrow particle size distribution. Besides, the MnBi alloy powder thus obtained contributes to improve the recording properties in the area of magnetic recording media. Further, from the viewpoint of productivity, it needs only very short time in comparison with the case in which the alloy is synthesized by a powder metallurgical process. Such effects of the present invention can be applied to the production of various alloy powders, and therefore it needs not to be mentioned that the effects are not limited to the MnBi alloy powder which has been taken up as a representative example because the evaluation of properties in final products is easy.

What is claimed is:

1. A powdery alloy mainly composed of Mn—Bi having a particle diameter of 5 $\mu$m or less which has a magnetic anisotropy, a coercive force of 6000 Oe or more and 35 emu/g or more in saturation magnetization, characterized in that said powdery alloy has been bound with a binder into a sheet of 0.5 to 10 $\mu$m thickness in a state magnetically oriented toward said direction of magnetic anisotropy, and when said sheet is measured toward said magnetic anisotropy direction at 16 kOe and 5 kOe, the ratio of residual magnetic flux densities of Mr16k and Mr5k (Mr5k/Mr16k) is 0.85 or more.

2. The powdery alloy according to claim 1, further comprising aluminum in an amount from 2 to 25 atm % based on the total manganese and aluminum.

3. The powdery alloy according to claim 1, further comprising nickel in an amount from 2 to 10 atm % based on the total manganese and nickel.

4. The powdery alloy according to claim 1, a mean particle size of 0.05 to 3 microns.

5. A powdery alloy mainly composed of Mn—Bi having a particle diameter of 5 $\mu$m or less and a magnetic anisotropy, wherein said powdery alloy has been bound with a binder into a sheet of 0.5 to 10 $\mu$m thickness in a state magnetically oriented toward said direction of magnetic anisotropy, and when said sheet is magnetized at 16 kOe, thereafter once kept at 80 K and returned to room temperature, the reduction rate of residual magnetization is 40% or less; and wherein when said sheet is measured toward said magnetic anisotropy direction at 16 kOe and 5 kOe, the ratio of residual magnetic flux densities of Mr16k and Mr5k (Mr5k/Mr16k) is 0.85 or more.

6. An alloy containing sheet of 0.5 to 10 $\mu$m thickness in which a powdery alloy mainly composed of Mn—Bi having particle diameter of 5 $\mu$m or less which has a magnetic anisotropy, a coercive force of 6000 Oe or more and 35 emu/g or more in saturation magnetization is bound with a binder into a sheet of 0.5 to 10 $\mu$m thickness in a state magnetically oriented toward said direction of magnetic anisotropy, wherein when said sheet is measured toward said magnetic anisotropy direction at 16 kOe and 5 kOe, the ratio of residual magnetic flux densities of Mr16k and Mr5k (Mr5k/Mr16k) is 0.85 or more.

7. An alloy containing magnetic recording and reproducing sheet of 0.5 to 10 $\mu$m thickness made by binding a powdery alloy mainly composed of Mn—Bi having particle diameter of 5 $\mu$m or less which has a magnetic anisotropy, a coercive force of 6000 Oe or more and 35 emu/g or more in saturation magnetization with a binder in a state magnetically oriented toward said direction of magnetic anisotropy, wherein when said sheet is measured toward said magnetic anisotropy direction at 16 kOe and 5 kOe, the ratio of residual magnetic flux densities of Mr16k and Mr5k (Mr5k/Mr16k) is 0.85 or more.

* * * * *

UNITED STATES PATENT AND TRADEMARK OFFICE
CERTIFICATE OF CORRECTION

PATENT NO.    : 6,143,096
DATED         : November 7, 2000
INVENTOR(S)   : Shinichi Kitahata et al.

It is certified that error appears in the above-identified patent and that said Letters Patent is hereby corrected as shown below:

<u>Title page,</u>
Please change "[*] Notice" to read as follows:

-- [*] Notice: <u>This patent issued on a continued prosecution application filed under 37 C.F.R. 1.53(d), and is subject to the twenty year patent term provisions 35 U.S.C. 154 (a)(2).</u>
   This patent is subject to a terminal disclaimer. --

Signed and Sealed this

Twenty-fifth Day of September, 2001

*Attest:*

*Nicholas P. Godici*

NICHOLAS P. GODICI
*Attesting Officer*    *Acting Director of the United States Patent and Trademark Office*